(12) United States Patent
Shin et al.

(10) Patent No.: US 9,759,280 B2
(45) Date of Patent: Sep. 12, 2017

(54) VARIABLE WEDGE OF ELECTRO WEDGE BRAKE, AND DEVICE AND METHOD OF ADJUSTING WEDGE ANGLE

(71) Applicant: Daegu Gyeongbuk Institute of Science and Technology, Daegu (KR)

(72) Inventors: Dong Hwan Shin, Daegu (KR); Sung Ho Jin, Daegu (KR); Seong Hun Lee, Daegu (KR); Choong Pyo Jeong, Daegu (KR)

(73) Assignee: Daegu Gyeongbuk Institute of Science and Technology, Daegu (KR)

( * ) Notice: Subject to any disclaimer, the term of this patent is extended or adjusted under 35 U.S.C. 154(b) by 0 days.

(21) Appl. No.: 15/007,336

(22) Filed: Jan. 27, 2016

(65) Prior Publication Data

US 2016/0327108 A1 Nov. 10, 2016

(30) Foreign Application Priority Data

May 8, 2015 (KR) .................. 10-2015-0064534

(51) Int. Cl.
*F16D 55/224* (2006.01)
*F16D 65/18* (2006.01)
(Continued)

(52) U.S. Cl.
CPC ........... *F16D 65/183* (2013.01); *F16D 55/14* (2013.01); *F16D 2121/14* (2013.01);
(Continued)

(58) Field of Classification Search
CPC .......... B60T 1/06; B60T 1/065; F16D 65/567; F16D 65/18; F16D 55/02; F16D 2121/24;
(Continued)

(56) References Cited

U.S. PATENT DOCUMENTS 8,249,791 B2 * 8/2012 Baumgartner ........ F16D 65/183
188/72.3
2008/0257660 A1 * 10/2008 Miller ..................... F16D 65/18
188/72.1
(Continued)

FOREIGN PATENT DOCUMENTS

| JP | 2009-511844 A | 3/2009 |
| JP | 2009-531628 A | 9/2009 |
| KR | 10-2012-0127820 A | 11/2012 |

OTHER PUBLICATIONS

Korean Intellectual Property Office, Communication dated Apr. 21, 2016 in counterpart application No. 10-2015-0064534.

*Primary Examiner* — Christopher Schwartz
(74) *Attorney, Agent, or Firm* — Sughrue Mion, PLLC

(57) ABSTRACT

Provided are a wedge angle adjusting device and method. A device for adjusting a wedge angle of a variable wedge of an electro wedge brake (EWB) includes a movable wedge including an inclined surface and a counter wedge which includes an inclined surface disposed to face the inclined surface of the movable wedge and is disposed to face the movable wedge. The wedge angle adjusting device includes a frictional coefficient estimate unit configured to estimate a frictional coefficient between a pad and a disc of the EWB, a wedge angle command unit configured to calculate a wedge angle command value, based on a estimation of frictional coefficient estimated by the frictional coefficient estimate unit, and a wedge control unit configured to adjust the wedge angle according to the calculated wedge angle command value.

19 Claims, 16 Drawing Sheets

(51) Int. Cl.
*F16D 55/14* (2006.01)
*F16D 121/24* (2012.01)
*F16D 125/66* (2012.01)
*F16D 121/14* (2012.01)
*F16D 127/10* (2012.01)

(52) U.S. Cl.
CPC ...... *F16D 2121/24* (2013.01); *F16D 2125/66* (2013.01); *F16D 2127/10* (2013.01)

(58) Field of Classification Search
CPC ......... F16D 2065/386; F16D 2066/005; F16D 2066/006
USPC ......... 188/71.7–71.9, 72.7–72.8; 701/70, 73, 701/80
See application file for complete search history.

(56) References Cited

U.S. PATENT DOCUMENTS

| | | | | |
|---|---|---|---|---|
| 2008/0289913 | A1* | 11/2008 | Baumann | F16D 65/095 188/72.2 |
| 2011/0005871 | A1* | 1/2011 | Pericevic | F16D 65/183 188/71.8 |
| 2011/0125380 | A1* | 5/2011 | Balogh | F16D 65/18 701/70 |
| 2013/0098715 | A1* | 4/2013 | Miller | F16D 65/092 188/71.9 |

\* cited by examiner

[EMB]

[EWB]

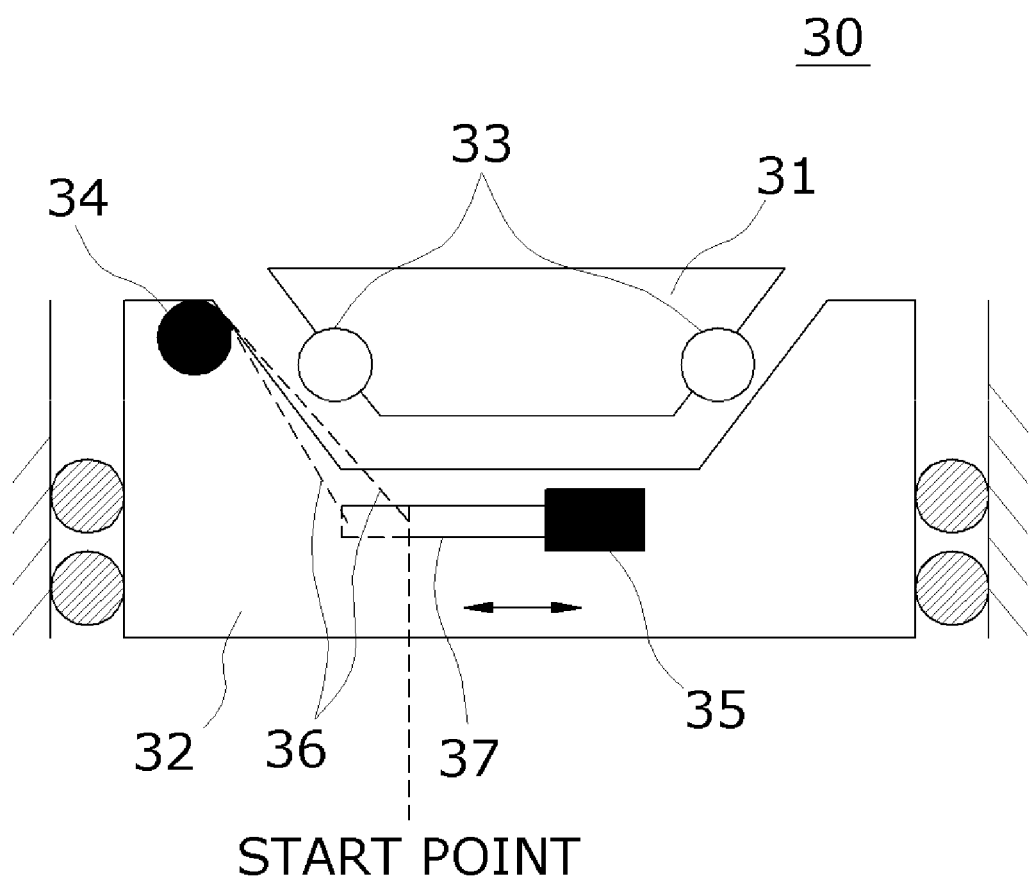

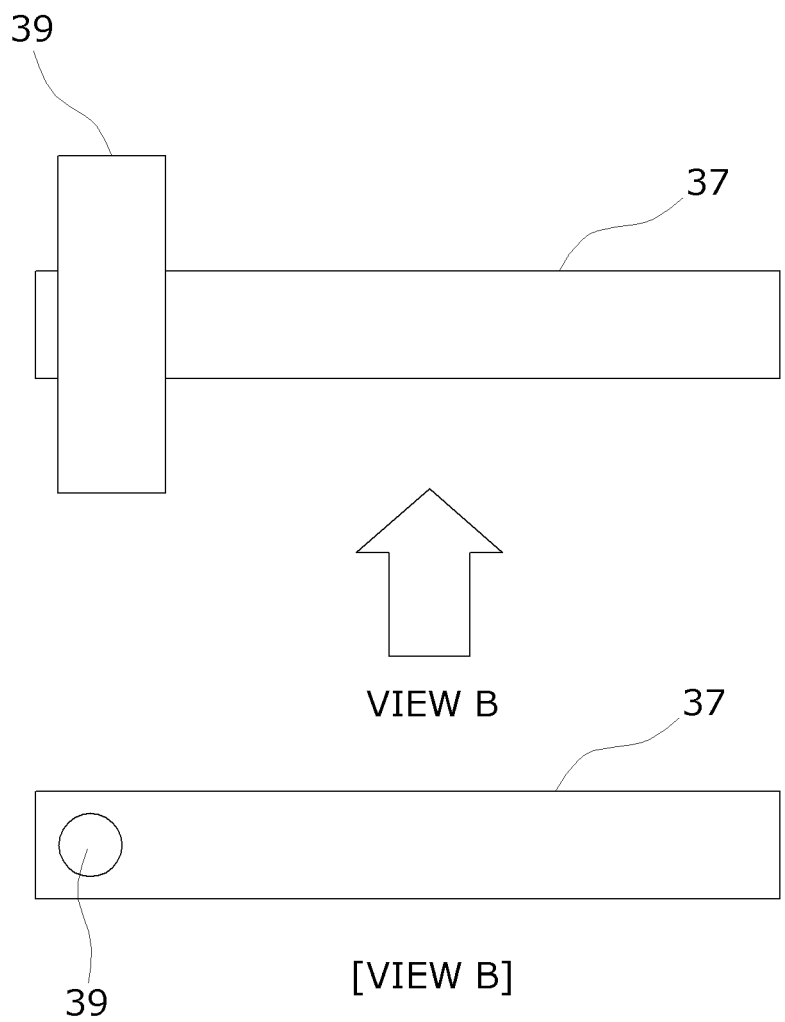

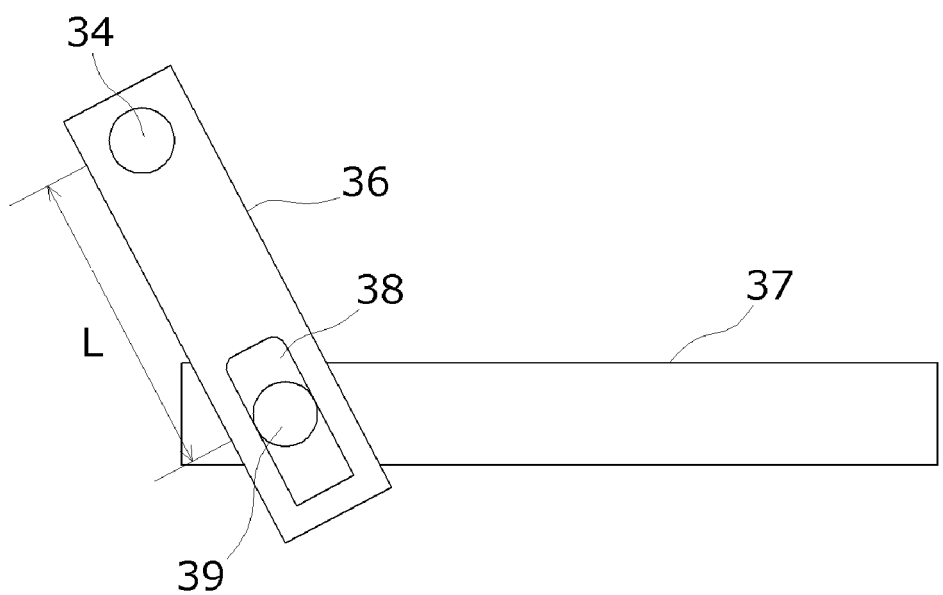

VARIABLE WEDGE OF ELECTRO WEDGE BRAKE, AND DEVICE AND METHOD OF ADJUSTING WEDGE ANGLE

CROSS-REFERENCE TO RELATED APPLICATIONS

This application claims priority under 35 U.S.C. §119 to Korean Patent Application No. 10-2015-0064534, filed on May 8, 2015, the disclosure of which is incorporated herein by reference in its entirety.

TECHNICAL FIELD

The present invention relates to a vehicle braking technology, and more particularly, to a structure of a variable wedge and a device and method of adjusting a wedge angle, which adjust a wedge angle according to a change in a frictional coefficient between a disc and a pad of an electro wedge brake.

BACKGROUND

A hydraulic brake which is applied to vehicles at present includes a hydraulic piston and a caliper housing which includes a hydraulic cylinder. The hydraulic piston pushes and clamps a pad in a direction toward a disc.

Electro mechanical brakes (EMBs) clamp a pad by using driving parts which includes an electric motor, a reducer, and a screw, instead of a hydraulic cylinder and a hydraulic piston of a hydraulic brake. In the EMBs, a time taken in generating a maximum clamping force which is the same as that of hydraulic brakes is shorter than the hydraulic brakes. Also, since the EMBs have a fast response time, a braking distance is shorter in the EMBs than hydraulic brakes.

The EMBs can be categorized into direct-clamping type EMBs, wedge type EMBs (hereinafter referred to as an electro wedge brake (EWB)) using a wedge structure, and a differential gear type EMB using a differential gear, based on a type of a driving mechanism for pushing a pad.

Comparing the EMBs by types, the direct-clamping type EMBs are easy to implement than other types. On the other hand, in comparison with the direct-clamping type EMBs, the EWBs generate the same clamping force by using a motor having a small power, due to a self-reinforcing effect.

Moreover, in comparison with the direct-clamping type EMBs or the EWBs which operate in a floating type or a sliding type, the differential gear type EMBs pull an outer pad in a direction toward a disc from the beginning, and thus have a response time faster than those of other EMBs having the floating type or the sliding type. Here, an operation sequence of a floating or sliding caliper is as follows. First, (1) an inner pad is pushed toward a disc, (2) the disc is brought in contact with the inner pad, and then, the caliper moves back to pull an outer pad toward the disc, and (3) the outer pad is brought in contact with the disc, and then, there are compression deformations of driving parts and a bending deformation of the caliper occurs until a required clamping force is generated.

In the direct-clamping type EMBs that push a pad without a special self-reinforcing mechanism, it is important to select a reduction ratio of a reducer and a motor, which are essential elements of driving parts, at a development stage for maintaining a fast response time. Also, since the driving parts should be disposed in a space occupied by a hydraulic caliper, a selection of the driving parts are limited in designing the caliper. In order to solve this limit, there have been some approaches which develop a dedicated motor having a high power and a high torque for EMBs, and thus, the driving parts having the required performance is disposed in a predetermined space in a direct drive type without a reducer. However, in developing the dedicated motor, it is required the high cost and much time for the developed motor to verify the performance and reliability of it.

The EWBs generate a higher braking force than that of the direct-clamping type EMBs by a combination of a motor having a low power and a low torque and a reducer having a low reduction gear ratio due to a self-reinforcement based on a wedge structure. That is, in generating a clamping force for pushing a pad, the EWBs are higher in clamping and clamping efficiency than the EMBs, wherein the clamping efficiency means a ratio of a generated clamping force to an input force of driving parts.

However, the self-reinforcing effect depends on a wedge angle which is initially determined and is reflected in manufacturing, and it is unable to maintain a high braking efficiency under an actual condition that a frictional coefficient between a pad and a disc is changed.

SUMMARY

Accordingly, the present invention provides a device and method of adjusting a wedge angle of a variable wedge, which maintain a high braking efficiency of an EWB irrespective of a change in a frictional coefficient between a disc and a pad of the EWB.

In one general aspect, a device for adjusting a wedge angle of a variable wedge of an electro wedge brake (EWB), which includes a movable wedge including an inclined surface and a counter wedge which includes an inclined surface disposed to face the inclined surface of the movable wedge and is disposed to face the movable wedge, includes: a frictional coefficient estimate unit configured to estimate a frictional coefficient between a pad and a disc of the EWB; a wedge angle command unit configured to calculate a wedge angle command value, based on a estimation of frictional coefficient estimated by the frictional coefficient estimate unit; and a wedge control unit configured to adjust the wedge angle according to the calculated wedge angle command value.

The frictional coefficient estimate unit may estimate the estimation of frictional coefficient "$\tilde{\mu}_i$" by using Equation below:

$$\tilde{\mu}_i = \tan\alpha_{i-1} - \frac{F_{ai}}{F_{ni}}$$

where $F_{ai}$ means an actuating force which is applied to the movable wedge at an ith sampling time, $F_{ni}$ means a clamping force which is applied to the pad at the ith sampling time according to movement of the counter wedge, and $\alpha_{i-1}$ means a measurement wedge angle which is measured at an i−1st sampling time.

The wedge angle command unit may calculate the wedge angle command value "$\alpha_{command}$" by using Equation below:

$$\alpha_{command} = a\tan\left(\tilde{\mu}_i + \frac{F_{ai}}{F_{ni}}\right)$$

where $\tilde{\mu}_i$ means the estimation of frictional coefficient estimated by the frictional coefficient estimate unit, $F_{ai}$ means the actuating force which is applied to the movable wedge 31 at the ith sampling time, and $F_{ni}$ means the clamping force which is applied to the pad at the ith sampling time.

The variable wedge may include: a movable shaft having a bar shape, the movable shaft being parallel to a bottom of the counter wedge; a linear motion driving part connected to one side of the movable shaft to linearly move the movable shaft in parallel with the bottom of the counter wedge; a fixed hinge fixed to a certain position of an upper portion of an inclined surface of the counter wedge; and a rotation shaft connected to the fixed hinge at one side of the rotation shaft and connected to the movable shaft at the other side, the rotation shaft having a bar shape.

The movable shaft may include a projection, and the projection may be inserted into a long hole formed in a lower side of the rotation shaft, and the movable shaft may be connected to the rotation shaft by the inserted projection.

In increasing the wedge angle with respect to an initial wedge angle of when the linear motion driving part is located at a start point, the wedge control unit may move the linear motion driving part in a direction toward the rotation shaft, and in reducing the wedge angle with respect to the initial wedge angle, the wedge control unit may move the linear motion driving part in a direction opposite to the rotation shaft.

In increasing the wedge angle, the wedge control unit may subtract $$\frac{\Delta y_{FIX}}{\tan\alpha_{command}}$$

from an initial x axis length "$\Delta x_0$" of when the linear motion driving part is located at a predetermined start point, and in reducing the wedge angle, the wedge control unit may subtract the initial x axis length "$\Delta x_0$", corresponding to when the linear motion driving part is located at the predetermined start point, from $$\frac{\Delta y_{FIX}}{\tan\alpha_{command}},$$

where $\Delta y_{FIX}$ means a predetermined vertical height between the fixed hinge and the movable shaft, and $\alpha_{command}$ means the wedge angle command value calculated by the wedge angle command unit.

In another general aspect, a method of adjusting a wedge angle of an electro wedge brake (EWB), which includes a movable wedge including an inclined surface and a counter wedge which includes an inclined surface disposed to face the inclined surface of the movable wedge and is disposed to face the movable wedge, includes: estimating a frictional coefficient between a pad and a disc of the EWB; calculating a wedge angle command value, based on an estimated estimation of frictional coefficient; and adjusting the wedge angle according to the calculated wedge angle command value.

The estimating may include estimating the estimation of frictional coefficient "$\tilde{\mu}_i$" by using Equation below:

$$\tilde{\mu}_i = \tan\alpha_{i-1} - \frac{F_{ai}}{F_{ni}}$$

where $F_{ai}$ means an actuating force which is applied to the movable wedge at an ith sampling time, $F_{ni}$ means a clamping force which is applied to the pad at the ith sampling time according to movement of the counter wedge, and $\alpha_{i-1}$ means a measurement wedge angle which is measured at an i−1st sampling time.

The calculating may include calculating the wedge angle command value "$\alpha_{command}$" by using Equation below:

$$\alpha_{command} = a\tan\left(\tilde{\mu}_i + \frac{F_{ai}}{F_{ni}}\right)$$

where $\tilde{\mu}_i$ means the estimation of frictional coefficient estimated by the frictional coefficient estimate unit, $F_{ai}$ means the actuating force which is applied to the movable wedge 31 at the ith sampling time, and $F_{ni}$ means the clamping force which is applied to the pad at the ith sampling time.

The EWB may include a variable wedge including: a movable shaft that has a bar shape and is parallel to a bottom of the counter wedge; a linear motion driving part that is connected to one side of the movable shaft to linearly move the movable shaft in parallel with the bottom of the counter wedge; a fixed hinge that is fixed to a certain position of an upper portion of an inclined surface of the counter wedge; and a rotation shaft that has a bar shape and is connected to the fixed hinge at one side of the rotation shaft and connected to the movable shaft at the other side, and the adjusting may include: moving, by the linear motion driving part, the movable shaft in a direction toward the rotation shaft to increase the wedge angle; and moving, by the linear motion driving part, the movable shaft in a direction opposite to the rotation shaft to reduce the wedge angle.

The adjusting may include: in increasing the wedge angle, subtracting $$\frac{\Delta y_{FIX}}{\tan\alpha_{command}}$$

from an initial x axis length "$\Delta x_0$" of when the linear motion driving part is located at a predetermined start point, and in reducing the wedge angle, subtracting the initial x axis length "$\Delta x_0$", corresponding to when the linear motion driving part is located at the predetermined start point, from $$\frac{\Delta y_{FIX}}{\tan\alpha_{command}},$$

where $\Delta y_{FIX}$ means a predetermined vertical height between the fixed hinge and the movable shaft, and $\alpha_{command}$ means the wedge angle command value calculated by the wedge angle command unit.

In another general aspect, a variable wedge of an electro wedge brake (EWB) includes: a movable wedge including an inclined surface; and a counter wedge disposed to face the movable wedge, the counter wedge including an inclined surface disposed to face the inclined surface of the movable wedge, and a wedge angle of the inclined surface of the counter wedge being adjusted.

The variable wedge may further include: a movable shaft having a bar shape, the movable shaft being parallel to a bottom of the counter wedge; a linear motion driving part connected to one side of the movable shaft to linearly move the movable shaft in parallel with the bottom of the counter wedge; a fixed hinge fixed to a certain position of an upper portion of an inclined surface of the counter wedge; and a rotation shaft connected to the fixed hinge at one side of the rotation shaft and connected to the movable shaft at the other side, the rotation shaft having a bar shape.

A long hole may be formed in a lower side of the rotation shaft, the movable shaft may include a projection. Also, the projection may be inserted into the long hole, and the movable shaft may be connected to the rotation shaft by the inserted projection.

In increasing the wedge angle with respect to an initial wedge angle of when the linear motion driving part is located at a start point, the linear motion driving part may move the movable shaft in a direction toward the rotation shaft, and in reducing the wedge angle with respect to the initial wedge angle, the linear motion driving part may move the movable shaft in a direction opposite to the rotation shaft.

Other features and aspects will be apparent from the following detailed description, the drawings, and the claims.

BRIEF DESCRIPTION OF THE DRAWINGS

FIG. 3 is a diagram illustrating a whole structure of a variable wedge of an EWB according to an embodiment of the present invention.

FIGS. 4A and 4B are diagrams illustrating forms of a rotation shaft and a movable shaft of a variable wedge according to an embodiment of the present invention.

FIGS. 7A, 7B and 7C are diagrams illustrating a connection structure change of a rotation shaft and a movable shaft of a variable wedge caused by adjustment of a wedge angle according to an embodiment of the present invention.

DETAILED DESCRIPTION OF EMBODIMENTS

Figure 1A:
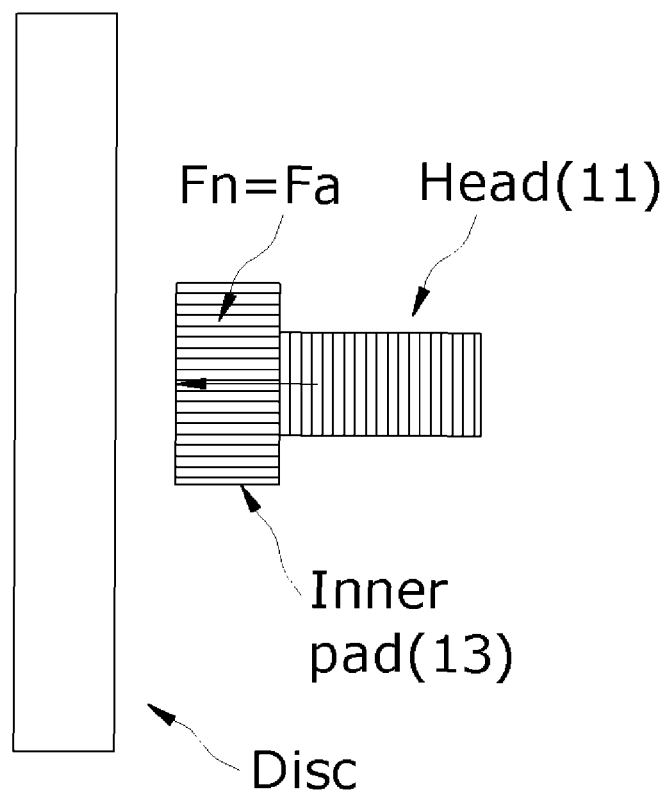
FIGS. 1A and 1B are exemplary diagrams for comparing a driving concept of an EWB with a driving concept of a direct-clamping type EMB.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the present invention will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present invention.

Before describing the present invention, concepts of a direct-clamping type EMB and an EWB (which is a wedge type EMB) capable of being applied to the present invention will be briefly described. This is for helping understand the present specification and should not be used as a meaning of limiting the technical spirit of the present invention if not being described as details limiting the present invention.

Figure 1B:
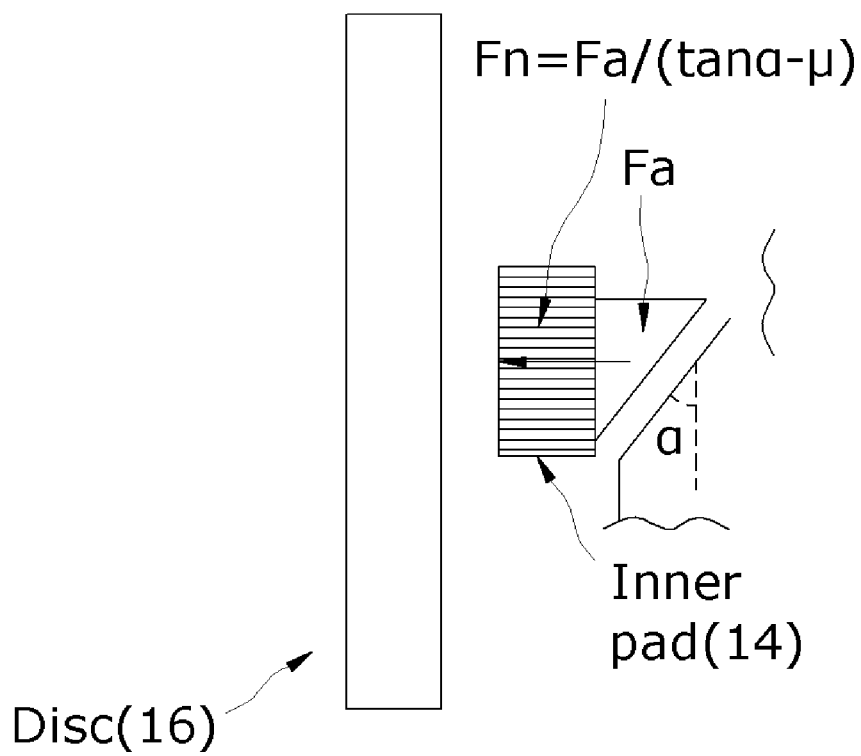

FIGS. 1A and 1B are exemplary diagrams for comparing a driving concept of an EWB with a driving concept of a direct-clamping type EMB.

In a direct-clamping type EMB 10 illustrated in FIG. 1A, a head 11 fastened to a nut of a screw may directly clamp an inner pad 13. In this case, a clamping force "$F_n$" that clamps the pad 13 may be the same as a force (an actuating force) "$F_a$" which is transferred to the head 11 through a linear motion driving part including a motor and a reducer ($F_n = F_a$).

On the other hand, in an EWM 20 illustrated in FIG. 1B, a wedge may be pushed in a rotation direction of a disc 16 with a small force without directly clamping an inner pad 14, thereby generating a high clamping force.

Figure 2:
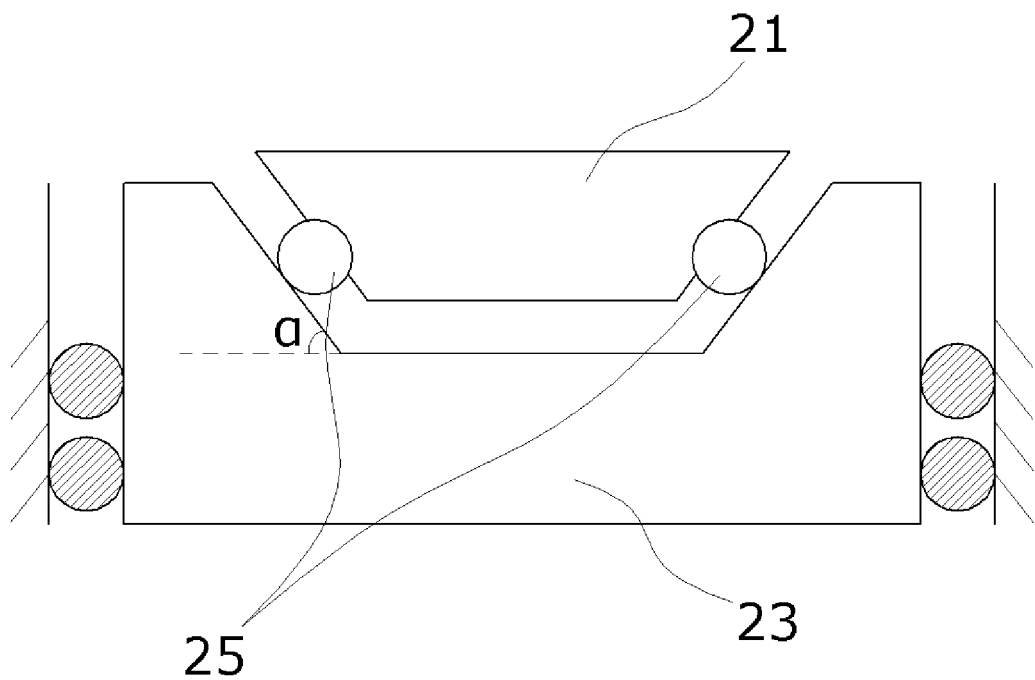
FIG. 2 is a diagram illustrating a wedge structure of a general EWB.

Here, the wedge may include a counter wedge and a movable wedge as illustrated in FIG. 2.

FIG. 2 is a diagram illustrating a wedge structure of a general EWB.

As well known, when a physical force (an actuating force) is transferred from a linear motion driving part, a movable wedge 21 may move along an inclined surface profile of a counter wedge 23. Furthermore, the counter wedge 23 may transfer a reaction force which is generated in moving or braking the movable wedge 21, to a caliper surface. In this case, an inclined surface angle (a wedge angle) "$\alpha$" of the counter wedge 23 may be a fixed value.

In a case where the movable wedge 21 moves along a profile of the counter wedge 23, a roller 25 may be used for reducing the loss of friction. The roller 25 may be disposed between the counter wedge 23 and the movable wedge 21 to contact each of the counter wedge 23 and the movable wedge 21, and thus, the loss of friction is further reduced than a direct surface between the counter wedge 23 and the movable wedge 21.

In an EMB, a clamping force "$F_n$" that clamps the pad 14 may be expressed as the following Equation (1):

$$F_n = F_a / (\tan \alpha - \mu) \quad (1)$$

where $F_a$ means an actuating force which is input to the movable wedge 21 through a linear motion driving part, a means a wedge angle, and µ means a frictional coefficient between the disc 16 and the pad 14. It can be seen through Equation (1) that as a denominator "tan α–µ" becomes closer to 0, a high clamping force "$F_n$" is generated.

It is known that the frictional coefficient "µ" between the disc 16 and the pad 14 is generally changed between 0.2 and 0.6, based on various environmental factors such as humidity, a temperature, and/or the like.

For example, when statics interpretation is performed based on a free body diagram of the movable wedge 21 in generating a clamping force and a braking force, an initial designed clamping efficiency "$C_{design}$" based on an initial wedge angle "$α_0$" may be expressed as the following Equation (2):

$$C_{design} = \frac{F_n}{F_a} = \frac{1}{(\tan α_0 - µ_0)} \quad (2)$$

where $F_n$ means a clamping force applied to the pad 14 in the EWB, $F_a$ means an actuating force which is input to the movable wedge 21 through the linear motion driving part, $α_0$ means an initial wedge angle which is previously set in designing an edge angle of the EWB 20, and $µ_0$ means a frictional coefficient between the disc 16 and the pad 14 which is previously set in designing the edge angle of the EWB 20.

In this case, when the frictional coefficient "µ" is 0.2 (which is a lowest value) or 0.6 (which is a highest value) in a state where the wedge angle "α", a clamping efficiency which is relatively lower than the initial designed clamping efficiency "$C_{design}$" may be obtained.

Therefore, as described above, in order to maintain the initial designed clamping efficiency "$C_{design}$", the wedge angle adjusting device according to an embodiment of the present invention may estimate the frictional coefficient "µ" between the pad 14 and the disc 16 which is being changed, and may adjust the wedge angle "α", based on the estimated frictional coefficient "µ".

Before describing an operation of the wedge angle adjusting device according to an embodiment of the present invention, a structure of a variable wedge of an EWB whose a wedge angle varies and a variable concept of the wedge angle will be described with reference to FIGS. 3 to 7C.

Figure 4A:
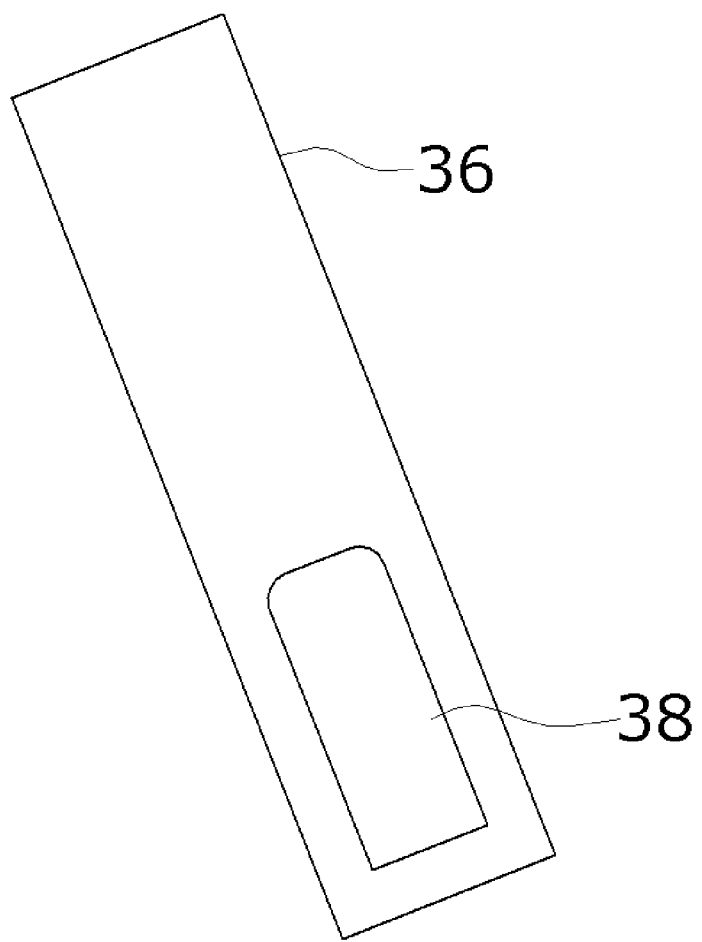
Figure 5A:
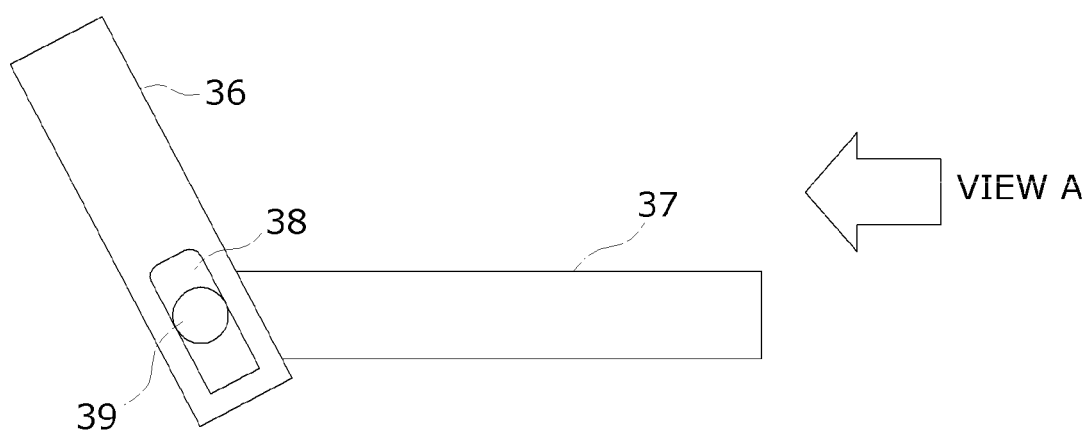
FIGS. 5A and 5B are diagrams illustrating a connection structure of a rotation shaft and a movable shaft of a variable wedge according to an embodiment of the present invention.
Figure 5B:
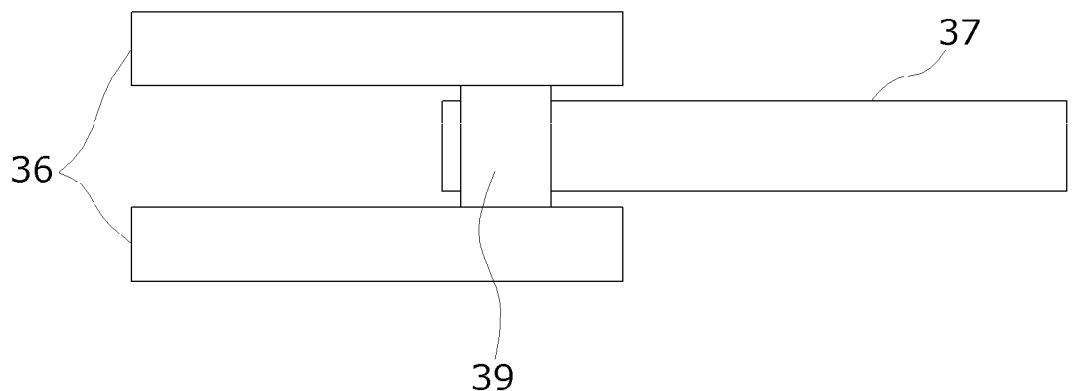
Figure 6:
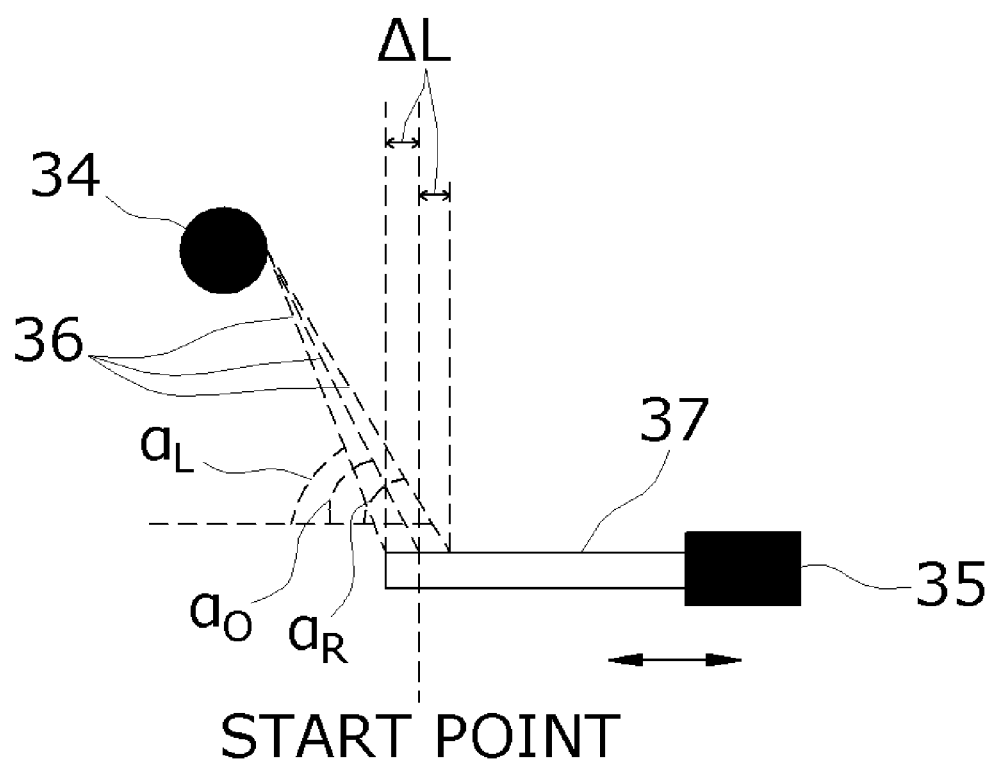
FIG. 6 is a diagram for describing an operation of adjusting a wedge angle of a variable wedge according to an embodiment of the present invention.
Figure 7B:
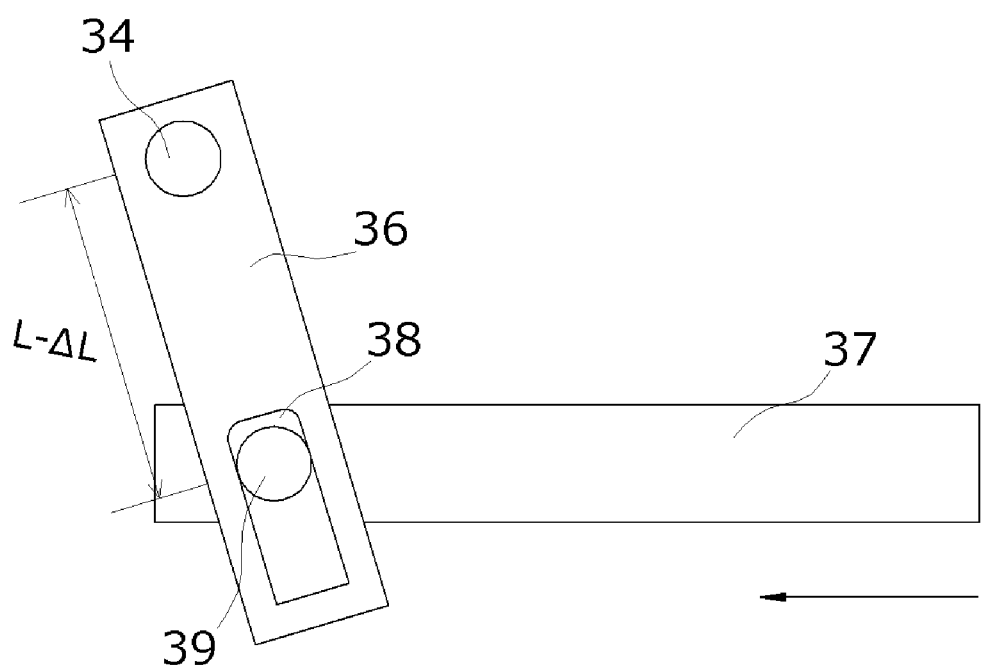

FIG. 3 is a diagram illustrating a whole structure of a variable wedge of an EWB according to an embodiment of the present invention. FIGS. 4A and 4B are diagrams illustrating forms of a rotation shaft and a movable shaft of a variable wedge according to an embodiment of the present invention. FIGS. 5A and 5B are diagrams illustrating a connection structure of a rotation shaft and a movable shaft of a variable wedge according to an embodiment of the present invention. FIG. 6 is a diagram for describing an operation of adjusting a wedge angle of a variable wedge according to an embodiment of the present invention. FIGS. 7A and 7B are diagrams illustrating a connection structure change of a rotation shaft and a movable shaft of a variable wedge caused by adjustment of a wedge angle according to an embodiment of the present invention.

As illustrated in FIG. 3, a variable wedge 30 of an EWB according to an embodiment of the present invention may include a movable wedge 31, a counter wedge 32, a fixed hinge 34, and a linear motion driving part 35.

The movable wedge 31 may include an inclined surface, which may be provided as one or more. When a physical force (an actuating force) is transferred from the outside (for example, a linear motion driving part including a motor, a reducer, etc.) like a wedge of a conventional EWB, the movable wedge 31 may move along an inclined surface profile of the counter wedge 32.

The counter wedge 32 may be disposed to face the movable wedge 31 and may include an inclined surface that is disposed to face the inclined surface of the movable wedge 31. In this case, the inclined surface of the counter wedge 32 may be provided equal to the number of the inclined surfaces of the movable wedge 31. Also, the counter wedge 32 may transfer a reaction force, which is generated based on moving or braking of the movable wedge 31, to a caliper surface like a wedge of a conventional EWB. Here, the caliper means a housing outside a pad.

In addition, a roller 33 may be provided between the movable wedge 31 and the counter wedge 32, for reducing the loss of friction between the movable wedge 31 and the counter wedge 32. The roller 33 may be disposed between the counter wedge 32 and the movable wedge 31 and may line-contact each of the counter wedge 32 and the movable wedge 31, thereby further reducing the loss of friction than a direct surface-contact of the counter wedge 32 and the movable wedge 31. In this case, the roller 33 may be mounted on the movable wedge 31, for adjusting an inclined surface angle (a wedge angle) of the counter wedge 32.

The fixed hinge 34 may be disposed at a certain position of an upper portion of one of the inclined surfaces of the counter wedge 32 and may include a rotation shaft 36 for adjusting a wedge angle of the counter wedge 32. In this case, as illustrated in FIG. 4A, the rotation shaft 36 may include a long hole 38 which is formed through long-hole-processing.

Moreover, the variable wedge 30 may include a linear motion driving part 35 that linearly and laterally moves in parallel with a bottom of the counter wedge 32, and the linear motion driving part 35 may include a movable shaft 37 parallel to the bottom of the counter wedge 32. In this case, as illustrated in FIG. 4B, the movable shaft 37 may include a projection 39, and the movable shaft 37 may be connected to the rotation shaft 36 by the projection 39 of the movable shaft 37. For example, as illustrated in FIG. 5A, the movable shaft 37 may be connected to the rotation shaft 36 in a structure where the projection 39 of the movable shaft 37 is inserted into the long hole 38 of the rotation shaft 36. In this case, when seen from a side, a structure of the rotation shaft 36 and the movable shaft 37 may be as illustrated in FIG. 5B.

In the variable wedge 30 having the structure, the rotation shaft 36 of the fixed hinge 34 may rotate according to the movable shaft 37 being laterally moved by the linear motion driving part 35, thereby adjusting a wedge angle.

For example, as illustrated in FIG. 6, when the linear motion driving part 35 is located at a start point, an initial wedge angle may be $α_0$. In this case, as illustrated in FIG. 7A, the projection 39 of the movable shaft 37 of the linear motion driving part 35 may be located at a middle portion of the long hole 38 of the rotation shaft 36, and a distance between the fixed hinge 34 and the movable shaft 37 may be M.

For example, when the linear motion driving part 35 moves by ΔL in a left direction with respect to the start point, the wedge angle may be adjusted to $α_L$. In this case, as illustrated in FIG. 7B, the projection 39 of the movable shaft 37 of the linear motion driving part 35 may be located at an upper portion of the long hole 38 of the rotation shaft 36, and a distance between the fixed hinge 34 and the movable shaft 37 may be M−ΔM.

Figure 7C:
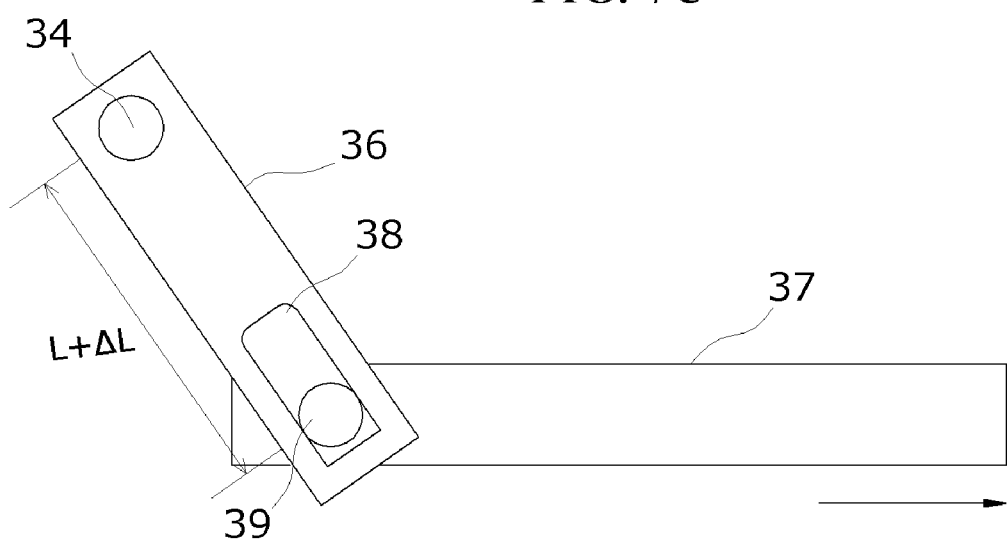

Likewise, when the linear motion driving part 35 moves by ΔL in a right direction with respect to the start point, the wedge angle may be adjusted to $\alpha_R$. In this case, as illustrated in FIG. 7C, the projection 39 of the movable shaft 37 of the linear motion driving part 35 may be located at a lower portion of the long hole 38 of the rotation shaft 36, and a distance between the fixed hinge 34 and the movable shaft 37 may be M+ΔM.

As described above, when the linear motion driving part 35 moves in a left and right direction with respect to the start point, a position of the other one side of the fixed hinge 34 may be moved, and thus, the wedge angle may be adjusted between $\alpha_R$ and $\alpha_L$ ($\alpha_R \leq \alpha_0 \leq \alpha_L$).

A left or right movement direction and a left or right movement distance of the linear motion driving part 35 may be calculated based on a wedge angle command value calculated by the wedge angle adjusting device according to an embodiment of the present invention. Movement of the linear motion driving part 35 based on the wedge angle command value will be described below in detail.

As described above, in order to adjust the wedge angle by linearly moving the linear motion driving part 35, the wedge angle adjusting device according to an embodiment of the present invention may estimate a frictional coefficient which is changed, calculate the wedge angle command value by using an estimated estimation of frictional coefficient, and move the linear motion driving part 35, based on the wedge angle command value, thereby adjusting the wedge angle of the variable wedge 30.

Hereinafter, an operation of the wedge angle adjusting device according to an embodiment of the present invention will be described in detail with reference to FIGS. 8 and 9.

Figure 8:
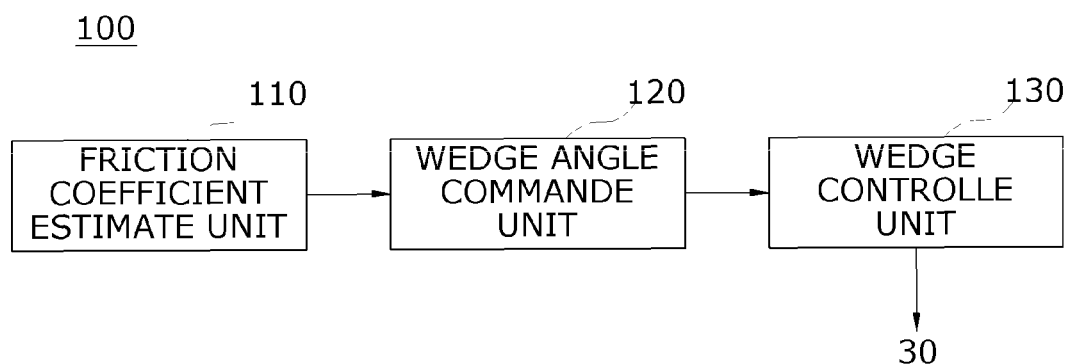
FIG. 8 is a block diagram of a wedge angle adjusting device according to an embodiment of the present invention.

FIG. 8 is a block diagram of a wedge angle adjusting device according to an embodiment of the present invention. FIG. 9 is a conceptual diagram of a control loop of an EWB including a wedge angle adjusting device according to an embodiment of the present invention.

As illustrated in FIG. 8, a wedge angle adjusting device 100 according to an embodiment of the present invention may include a frictional coefficient estimate unit 110, a wedge angle command unit 120, and a wedge control unit 130.

The frictional coefficient estimate unit 110 may estimate a frictional coefficient between a pad and a disc which is changed in real time. In this case, the frictional coefficient estimate unit 110 may calculate a estimation of frictional coefficient "$\tilde{\mu}_i$" by using the following Equation (3):

$$\tilde{\mu}_i = \tan \alpha_{i-1} - \frac{F_{ai}}{F_{ni}} \tag{3}$$

where $F_{ai}$ means a physical force (an actuating force) which is applied to the movable wedge 31 at an ith sampling time, $F_{ni}$ means a physical force (a clamping force) which is applied to the pad at the ith sampling time according to movement of a mechanical structure 93 including the counter wedge 32, and $\alpha_{i-1}$ means a measurement wedge angle which is measured at an i−1st sampling time.

Figure 9:
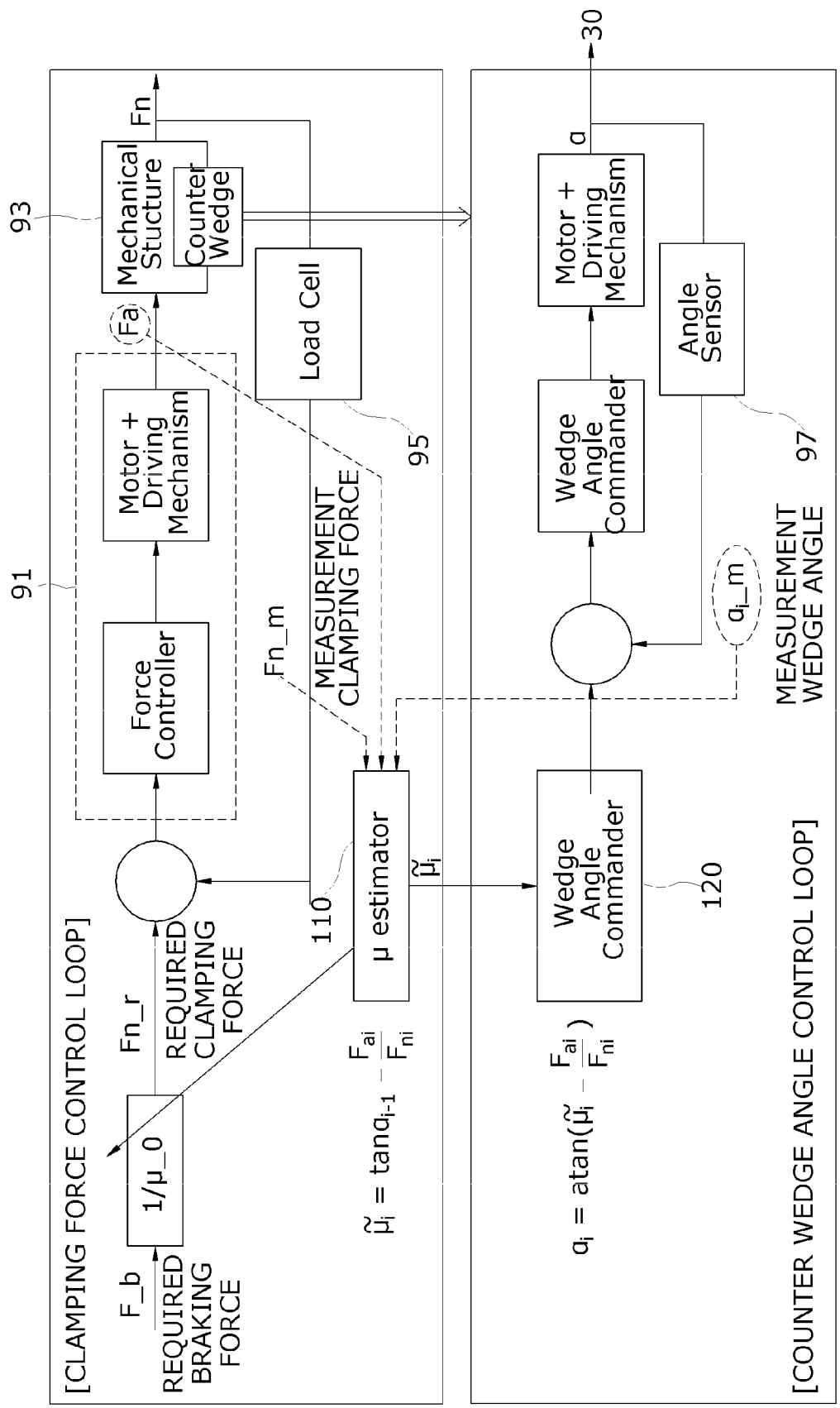
FIG. 9 is a conceptual diagram of a control loop of an EWB including a wedge angle adjusting device according to an embodiment of the present invention.

In detail, as illustrated in FIG. 9, an actuating force "$F_a$" may be a physical force which is applied to the mechanical structure 93 including the variable wedge 30 by a linear motion driving part 91 including a force controller, a motor, and a reducer, based on a required braking force and a required clamping force.

A clamping force "$F_n$" may be a physical force which is applied to the pad according to the mechanical structure 93 including the variable wedge 30 being moved by the actuating force "$F_a$" as illustrated in FIG. 9. The clamping force "$F_n$" may be measured by a load cell 95 disposed at a certain position near the pad.

The measurement wedge angle "$\alpha_{i-1}$", as illustrated in FIG. 9, may be an angle of an inclined surface of the counter wedge 32 measured by an angle sensor 97 which is disposed at a certain position near the counter wedge 32.

The wedge angle command unit 120 may calculate a wedge angle command value by using the estimation of frictional coefficient "$\tilde{\mu}_i$" estimated by the frictional coefficient estimate unit 110. In this case, the wedge angle command unit 120 may calculate the wedge angle command value "$\alpha_i = \alpha_{command}$" by using the following Equation (4):

$$\alpha_{command} = a \tan\left(\tilde{\mu}_i + \frac{F_{ai}}{F_{ni}}\right) \tag{4}$$

where $\tilde{\mu}_i$ means the estimation of frictional coefficient estimated by the frictional coefficient estimate unit 110, $F_{ai}$ means the actuating force which is applied to the movable wedge 31 at the ith sampling time, and $F_{ni}$ means the clamping force which is applied to the pad at the ith sampling time.

The wedge control unit 130 may adjust the wedge angle of the EWB according to an embodiment of the present invention by using the wedge angle command value "$\alpha_{command}$" calculated by the wedge angle command unit 120. In this case, the wedge control unit 130 may calculate a movement command value which includes a linear movement direction and a linear movement distance of the linear motion driving part 35, based on the wedge angle command value "$\alpha_{command}$", thereby adjusting the wedge angle of the variable wedge 30.

Figure 10:
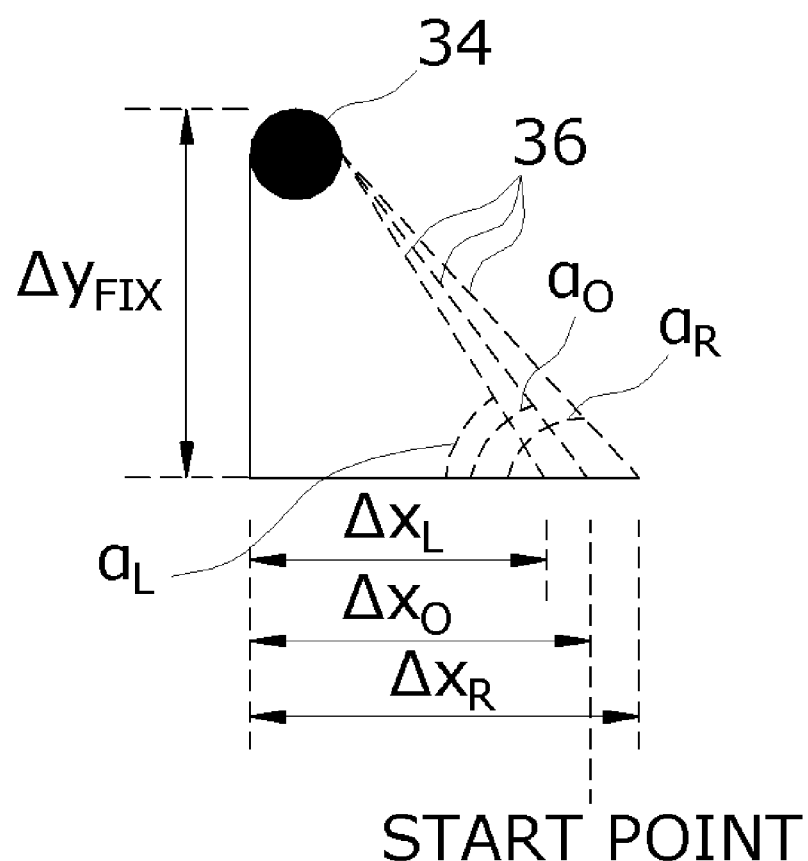
FIG. 10 is a diagram showing a relationship between a movement command value of a linear motion driving part and an adjusted wedge angle according to an embodiment of the present invention.

For example, geometric relationship analysis for calculating a movement command value of the linear motion driving part 35 based on the wedge angle command value "$\alpha_{command}$" is as illustrated in FIG. 10.

FIG. 10 is a diagram showing a relationship between a movement command value of a linear motion driving part and an adjusted wedge angle according to an embodiment of the present invention.

In FIG. 10, $\Delta y_{FIX}$ means a vertical height (a y axis with respect to a bottom of the counter wedge 32) between the fixed hinge 34 and the movable shaft 37 of the linear motion driving part 35, and may be a previously fixed value.

For example, in a case of increasing a wedge angle to $\alpha_L$ with respect to the initial wedge angle "$\alpha_0$" of when the linear motion driving part 35 is located at the start point, the linear motion driving part 35 may move by ΔL to the left. That is, a position of the linear motion driving part 35 may be a value "$\Delta x_L = \Delta x_0 - \Delta L = \Delta x_{L\_command}$" which is obtained by subtracting ΔL from $\Delta x_0$ that is an initial x axis length of when the linear motion driving part 35 is located at the start point. That is, the wedge angle "$\alpha_L$" may be determined based on an adjusted value "$\Delta x_L$" and a fixed value "$\Delta y_{FIX}$" as expressed in the following Equation (5):

$$\alpha_L = a \tan\left(\frac{\Delta y_{FIX}}{\Delta x_L}\right) \tag{5}$$

where $\Delta y_{FIX}$ means a vertical height (the y axis with respect to a bottom of the counter wedge 32) between the fixed hinge 34 and the movable shaft 37 of the linear motion driving part 35 and may be a previously fixed value, and $\Delta x_L$ means a value obtained by subtracting $\Delta L$ from the initial x axis length "$\Delta x_0$" of when the linear motion driving part 35 is located at the start point.

Therefore, when the wedge angle increases to $\alpha_L$ with respect to the initial wedge angle "$\alpha_0$", a movement command value "$\Delta L_{command}$" for the linear motion driving part 35 may be expressed as the following Equation (6):

$$\Delta L_{command} = \Delta x_0 - \Delta x_{L\_command} = \Delta x_0 - \frac{\Delta y_{FIX}}{\tan\alpha_{command}} \quad (6)$$

where $\Delta x_{L\_command}$ means a value obtained by subtracting $\Delta L$ from the initial x axis length "$\Delta x_0$" of when the linear motion driving part 35 is located at the start point, $\Delta y_{FIX}$ means a vertical height between the fixed hinge 34 and the movable shaft 37 of the linear motion driving part 35, and $\alpha_{command}$ means a wedge angle command value calculated by the wedge angle command unit 120.

On the other hand, in a case of reducing the wedge angle to $\alpha_R$ with respect to the initial wedge angle "$\alpha_0$" of when the linear motion driving part 35 is located at the start point, the linear motion driving part 35 may move by $\Delta L$ to the right. That is, the position of the linear motion driving part 35 may be a value "$\Delta x_R = \Delta x_0 + \Delta L = \Delta x_{L\_command}$" which is obtained by adding $\Delta L$ to $\Delta x_0$ that is the initial x axis length of when the linear motion driving part 35 is located at the start point. That is, the wedge angle "$\alpha_R$" may be determined based on an adjusted value "$\Delta x_R$" and the fixed value "$\Delta y_{FIX}$" as expressed in the following Equation (7):

$$\alpha_R = a\tan\left(\frac{\Delta y_{FIX}}{\Delta x_R}\right) \quad (7)$$

where $\Delta y_{FIX}$ means the vertical height (the y axis with respect to a bottom of the counter wedge 32) between the fixed hinge 34 and the movable shaft 37 of the linear motion driving part 35 and may be a previously fixed value, and $\Delta x_R$ means a value obtained by adding $\Delta L$ to the initial x axis length "$\Delta x_0$" of when the linear motion driving part 35 is located at the start point.

Therefore, when the wedge angle is reduced to $\alpha_R$ with respect to the initial wedge angle "$\alpha_0$", a movement command value "$\Delta L_{command}$" for the linear motion driving part 35 may be expressed as the following Equation (8):

$$\Delta L_{command} = \Delta x_0 - \Delta x_{L\_command} = \Delta x_0 + \frac{\Delta y_{FIX}}{\tan\alpha_{command}} \quad (8)$$

where $\Delta x_{L\_command}$ means a value obtained by adding $\Delta L$ to the initial x axis length "$\Delta x_0$" of when the linear motion driving part 35 is located at the start point, $\Delta y_{FIX}$ means a vertical height between the fixed hinge 34 and the movable shaft 37 of the linear motion driving part 35, and $\alpha_{command}$ means a wedge angle command value calculated by the wedge angle command unit 120.

As described above, according to the embodiments of the present invention, a wedge angle of the variable wedge may be adjusted according to an estimated change in a frictional coefficient, and thus, an initially designed self-reinforcing rate is maintained, thereby maintaining a high braking efficiency even when a lubrication film is generated due to a foreign material flowing into a space between the pad and disc of the EWB or a frictional coefficient between the pad and the disc is changed due to high heat. That is, according to the embodiments of the present invention, a high clamping force is generated based on a small power irrespective of a change in a frictional coefficient.

Figure 11:
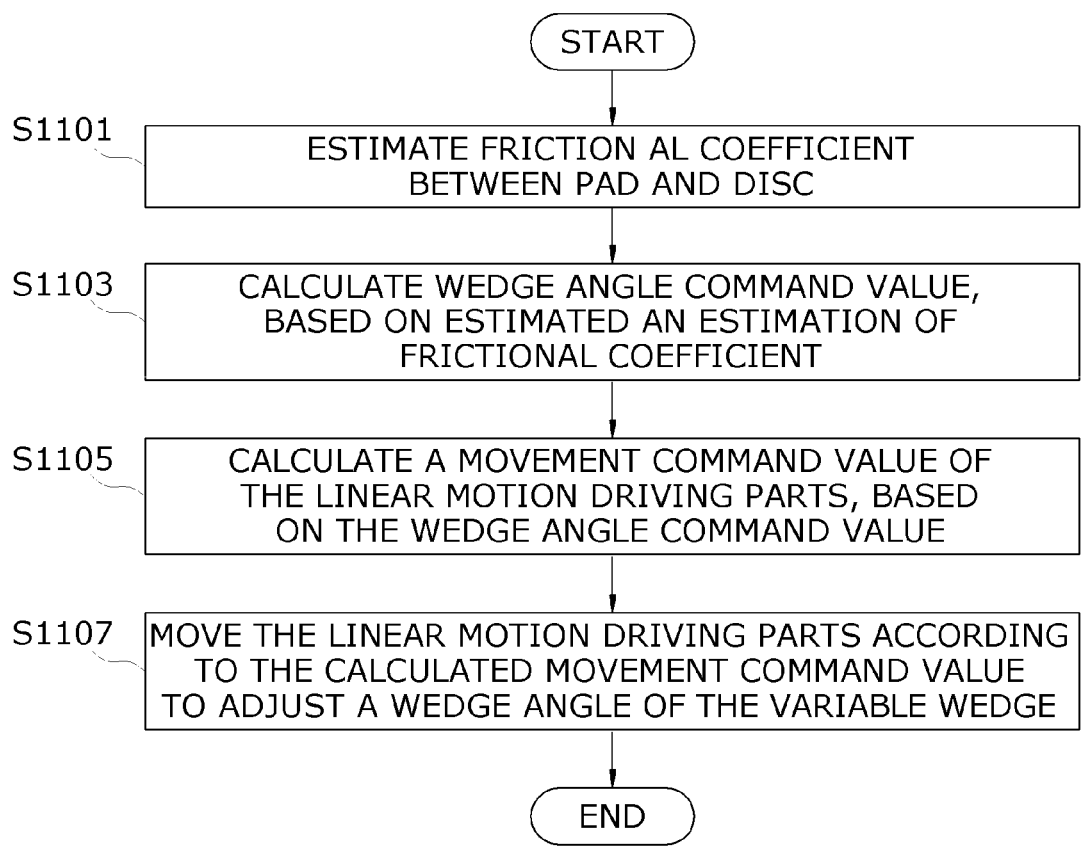
FIG. 11 is a diagram for describing a method of adjusting a wedge angle of a variable wedge according to an embodiment of the present invention.

FIG. 11 is a diagram for describing a method of adjusting a wedge angle of a variable wedge according to an embodiment of the present invention.

First, the method may estimate a frictional coefficient between a pad and a disc of the variable wedge 30 which is changed in real time in step S1101. In this case, a estimation of frictional coefficient may be calculated as expressed in Equation (3).

In step S1103, the method may calculate a wedge angle command value by using the estimation of frictional coefficient "$\tilde{\mu}_i$" which is estimated in step S1101. In this case, the wedge angle command value "$\alpha_i = \alpha_{command}$" may be calculated as expressed in Equation (4).

In step S1105, the method may calculate a movement command value of the linear motion driving part 35, based on the wedge angle command value which is calculated in step S1103. In step S1107, the method may move the linear motion driving part 35 according to the calculated movement command value to adjust a wedge angle of the variable wedge.

For example, in a case of increasing the wedge angle to $\alpha_L$ with respect to the initial wedge angle "$\alpha_0$" of when the linear motion driving part 35 is located at the start point, the linear motion driving part 35 may move by $\Delta L$ to the left. In this case, a position of the linear motion driving part 35 may be a value "$\Delta x_L = \Delta x_0 - \Delta$" which is obtained by subtracting $\Delta L$ from $\Delta x_0$ that is the initial x axis length of when the linear motion driving part 35 is located at the start point. That is, the wedge angle "$\alpha_L$" may be determined based on the adjusted value "$\Delta x_L$" and the fixed value "$\Delta y_{FIX}$".

Therefore, when the wedge angle increases to $\alpha_L$ with respect to the initial wedge angle "$\alpha_0$", a movement command value "$\Delta L_{command}$" for the linear motion driving part 35 may be expressed as Equation (6).

On the other hand, in a case of reducing the wedge angle to $\alpha_R$ with respect to the initial wedge angle "$\alpha_0$" of when the linear motion driving part 35 is located at the start point, the linear motion driving part 35 may move by $\Delta L$ to the right. In this case, the position of the linear motion driving part 35 may be a value "$\Delta x_R = \Delta x_0 + \Delta L$" which is obtained by adding $\Delta L$ to $\Delta x_0$ that is the initial x axis length of when the linear motion driving part 35 is located at the start point. That is, the wedge angle "$\alpha_R$" may be determined based on an adjusted value "$\Delta x_R$" and the fixed value "$\Delta y_{FIX}$" as expressed in Equation (7).

Therefore, when the wedge angle is reduced to $\alpha_R$ with respect to the initial wedge angle "$\alpha_0$", a movement command value "$\Delta L_{command}$" for the linear motion driving part 35 may be expressed as Equation (8).

According to the embodiments of the present invention, a wedge angle of the variable wedge may be adjusted according to an estimated change in a frictional coefficient, and thus, an initially designed self-reinforcing rate is maintained, thereby maintaining a high braking efficiency even when a lubrication film is generated due to a foreign material flowing into a space between the pad and disc of the EWB or a frictional coefficient between the pad and the disc is changed due to high heat. That is, according to the embodiments of the present invention, a high clamping force is generated based on a small power irrespective of a change in a frictional coefficient.

A number of exemplary embodiments have been described above. Nevertheless, it will be understood that various deformations may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A device for adjusting a wedge angle of a variable wedge of an electro wedge brake (EWB) which includes a movable wedge, including an inclined surface, and a counter wedge, which includes an inclined surface disposed to face the inclined surface of the movable wedge and is disposed to face the movable wedge, the device comprising:
a frictional coefficient estimate unit configured to estimate a frictional coefficient between a pad and a disc of the EWB;
a wedge angle command unit configured to calculate a wedge angle command value, based on the frictional coefficient estimated by the frictional coefficient estimate unit; and
a wedge control unit configured to adjust the wedge angle according to the calculated wedge angle command value,
wherein the wedge angle command unit calculates the wedge angle command value "$\alpha_{command}$" by using Equation below:

$$\alpha_{command} = a\tan\left(\tilde{\mu}_i + \frac{F_{ai}}{F_{ni}}\right)$$

where $\tilde{\mu}_i$ means the frictional coefficient estimated by the frictional coefficient estimate unit, $F_{ai}$ means an actuating force which is applied to the movable wedge at an i-th sampling time, $F_{ni}$ means a clamping force which is applied to the pad at the i-th sampling time, wherein i is an integer equal to or greater than one.

2. The device of claim 1, wherein the frictional coefficient estimate unit estimates the frictional coefficient "$\tilde{\mu}_i$" by using Equation below:

$$\tilde{\mu}_i = \tan\alpha_{i-1} - \frac{F_{ai}}{F_{ni}}$$

where $F_{ai}$ means the actuating force which is applied to the movable wedge at the i-th sampling time, $F_{ni}$ means the clamping force which is applied to the pad at the i-th sampling time according to movement of the counter wedge, and $\alpha_{i-1}$ means a measurement wedge angle which is measured at an (i−1)-th sampling time.

3. A method of adjusting a wedge angle of an electro wedge brake (EWB) which includes a movable wedge including an inclined surface and a counter wedge which includes an inclined surface disposed to face the inclined surface of the movable wedge and is disposed to face the movable wedge, the method comprising:
estimating a frictional coefficient between a pad and a disc of the EWB;
calculating a wedge angle command value, based on an estimated frictional coefficient; and
adjusting the wedge angle according to the calculated wedge angle command value,
wherein the calculating comprises calculating the wedge angle command value "$\alpha_{command}$" by using Equation below:

$$\alpha_{command} = a\tan\left(\tilde{\mu}_i + \frac{F_{ai}}{F_{ni}}\right)$$

where $\tilde{\mu}_i$ means the frictional coefficient estimated by the frictional coefficient estimate unit, $F_{ai}$ means the actuating force which is applied to the movable wedge at the i-th sampling time, and $F_{ni}$ means the clamping force which is applied to the pad at the i-th sampling time.

4. The method of claim 3, wherein
the EWB comprises a variable wedge including: a movable shaft that has a bar shape and is parallel to a bottom of the counter wedge; a linear motion driving part that is connected to one side of the movable shaft to linearly move the movable shaft in parallel with the bottom of the counter wedge; a fixed hinge that is fixed to a certain position of an upper portion of the inclined surface of the counter wedge; and a rotation shaft that has a bar shape and is connected to the fixed hinge at first side of the rotation shaft and connected to the movable shaft at a second side, and
the adjusting comprises:
moving, by the linear motion driving part, the movable shaft in a direction toward the rotation shaft to increase the wedge angle; and
moving, by the linear motion driving part, the movable shaft in a direction opposite to the rotation shaft to reduce the wedge angle.

5. The method of claim 4, wherein the adjusting comprises:
in increasing the wedge angle, subtracting $$\frac{\Delta y_{FIX}}{\tan\alpha_{command}}$$

from an initial x axis length "$\Delta x_0$" of when the linear motion driving part is located at a predetermined start point, and
in reducing the wedge angle, subtracting the initial x axis length "$\Delta x_0$", corresponding to when the linear motion driving part is located at the predetermined start point, from $$\frac{\Delta y_{FIX}}{\tan\alpha_{command}},$$

where $\Delta y_{FIX}$ means a predetermined vertical height between the fixed hinge and the movable shaft, and $\alpha_{command}$ means the wedge angle command value calculated by the wedge angle command unit.

6. The method of claim 3, wherein the estimating comprises estimating the frictional coefficient "$\tilde{\mu}_i$" by using Equation below:

$$\tilde{\mu}_i = \tan \alpha_{i-1} - \frac{F_{ai}}{F_{ni}}$$

where $F_{ai}$ means an actuating force which is applied to the movable wedge at an i-th sampling time, $F_{ni}$ means a clamping force which is applied to the pad at the i-th sampling time according to movement of the counter wedge, and $\alpha_{i-1}$ means a measurement wedge angle which is measured at an (i−1)-th sampling time, wherein i is an integer equal to or greater than one.

7. A variable wedge of an electro wedge brake (EWB), the variable wedge comprises:
a movable wedge including an inclined surface;
a counter wedge disposed to face the movable wedge, the counter wedge including an inclined surface disposed to face the inclined surface of the movable wedge, and a wedge angle of the inclined surface of the counter wedge being adjusted;
a movable shaft positioned to the counter wedge, the movable shaft configured to laterally move; and
a linear motion driving part connected to one side of the movable shaft to linearly move the movable shaft.

8. The variable wedge of claim 7, further comprises:
a fixed hinge fixed to a certain position of an upper portion of an inclined surface of the counter wedge; and
a rotation shaft connected to the fixed hinge at a first side of the rotation shaft and connected to the movable shaft at a second side, the rotation shaft having a bar shape.

9. The variable wedge of claim 8, wherein
a long hole is formed in a lower side of the rotation shaft, the movable shaft comprises a projection, and
the projection is inserted into the long hole, and the movable shaft is connected to the rotation shaft by the inserted projection.

10. The variable wedge of claim 9, wherein
the rotation shaft is formed as a pair, and a first rotation shaft is formed in a first side of the projection and a second rotation shaft is formed in a second side of the projection.

11. The variable wedge of claim 8, wherein
in increasing the wedge angle with respect to an initial wedge angle of when the linear motion driving part is located at a start point, the linear motion driving part moves the movable shaft in a direction toward the rotation shaft, and
in reducing the wedge angle with respect to the initial wedge angle, the linear motion driving part moves the movable shaft in a direction opposite to the rotation shaft.

12. The variable wedge of claim 7, wherein
the moveable shaft has a bar shape, the movable shaft being parallel to a bottom of the counter wedge, and
the linear motion driving part move the movable shaft in parallel with the bottom of the counter wedge.

13. The variable wedge of claim 7, further comprises:
a roller disposed between the counter wedge and the movable wedge and line-contacted with each of the counter wedge and the movable wedge.

14. The variable wedge of claim 7, wherein
the movable wedge has a plurality of inclined surfaces and the counter wedge has the same number of inclined surfaces as the inclined surfaces of the movable wedge.

15. A device for adjusting a wedge angle of a variable wedge of an electro wedge brake (EWB) which includes a movable wedge including an inclined surface and a counter wedge which includes an inclined surface disposed to face the inclined surface of the movable wedge and is disposed to face the movable wedge, the device comprising:
a frictional coefficient estimate unit configured to estimate a frictional coefficient between a pad and a disc of the EWB;
a wedge angle command unit configured to calculate a wedge angle command value, based on the frictional coefficient estimated by the frictional coefficient estimate unit; and
a wedge control unit configured to adjust the wedge angle according to the calculated wedge angle command value,
wherein the variable wedge comprises:
a movable shaft positioned to the counter wedge, the movable shaft configured to laterally move; and
a linear motion driving part connected to one side of the movable shaft to linearly move the movable shaft.

16. The device of claim 15, wherein the variable wedge further comprise:
a fixed hinge fixed to a certain position of an upper portion of the inclined surface of the counter wedge; and
a rotation shaft connected to the fixed hinge at a first side of the rotation shaft and connected to the movable shaft at a second side, the rotation shaft having a bar shape.

17. The device of claim 16, wherein
the movable shaft comprises a projection, and
the projection is inserted into a long hole formed in a lower side of the rotation shaft, and the movable shaft is connected to the rotation shaft by the inserted projection.

18. The device of claim 16, wherein
in increasing the wedge angle with respect to an initial wedge angle of when the linear motion driving part is located at a start point, the wedge control unit moves the linear motion driving part in a direction toward the rotation shaft, and
in reducing the wedge angle with respect to the initial wedge angle, the wedge control unit moves the linear motion driving part in a direction opposite to the rotation shaft.

19. The device of claim 16, wherein
in increasing the wedge angle, the wedge control unit subtracts $$\frac{\Delta y_{FIX}}{\tan \alpha_{command}}$$

from an initial x axis length "$\Delta x_0$" of when the linear motion driving part is located at a predetermined start point, and
in reducing the wedge angle, the wedge control unit subtracts the initial x axis length "$\Delta x_0$", corresponding to when the linear motion driving part is located at the predetermined start point, from $$\frac{\Delta y_{FIX}}{\tan \alpha_{command}},$$

where $\Delta y_{FIX}$ means a predetermined vertical height between the fixed hinge and the movable shaft, and $\alpha_{command}$ means the wedge angle command value calculated by the wedge angle command unit.

* * * * *